US012592587B2

(12) United States Patent
Morita

(10) Patent No.: US 12,592,587 B2
(45) Date of Patent: Mar. 31, 2026

(54) WIRELESS POWER TRANSMISSION SYSTEM

(71) Applicant: CANON KABUSHIKI KAISHA, Tokyo (JP)

(72) Inventor: Jun Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 18/047,947

(22) Filed: Oct. 19, 2022

(65) Prior Publication Data

US 2023/0126739 A1 Apr. 27, 2023

(30) Foreign Application Priority Data

Oct. 26, 2021 (JP) ................................. 2021-175034

(51) Int. Cl.
| | |
|---|---|
| *H02J 50/40* | (2016.01) |
| *B41J 2/175* | (2006.01) |
| *H02J 50/00* | (2016.01) |
| *H02J 50/70* | (2016.01) |
| *B41J 29/393* | (2006.01) |

(52) U.S. Cl.
CPC ......... *H02J 50/402* (2020.01); *B41J 2/17503* (2013.01); *H02J 50/005* (2020.01); *H02J 50/40* (2016.02); *H02J 50/70* (2016.02); *B41J 2029/3932* (2013.01)

(58) Field of Classification Search
CPC ........ H02J 50/402; H02J 50/005; H02J 50/05; H02J 50/10; H02J 50/70; B41J 23/32
See application file for complete search history.

(56) References Cited

U.S. PATENT DOCUMENTS

| | | | | |
|---|---|---|---|---|
| 2011/0187317 A1* | 8/2011 | Mitake | ................... | B60L 5/005 |
| | | | | 320/108 |
| 2020/0343766 A1* | 10/2020 | Tanaka | ................. | B60R 16/023 |
| 2021/0012955 A1* | 1/2021 | Oki | ......................... | B60M 1/10 |

FOREIGN PATENT DOCUMENTS

| | | |
|---|---|---|
| JP | 6701231 B2 | 5/2020 |
| JP | 2020098919 A | 6/2020 |
| JP | 2021065014 A | 4/2021 |
| JP | 2021145400 A | 9/2021 |
| JP | 2021170854 A | 10/2021 |
| WO | 2017046946 A1 | 3/2017 |
| WO | 2017149600 A1 | 9/2017 |

* cited by examiner

*Primary Examiner* — Daniel Cavallari

(74) *Attorney, Agent, or Firm* — Canon U.S.A., Inc. IP Division

(57) ABSTRACT

A wireless power transmission system includes a plurality of power transmitting antennas, a plurality of power receiving antennas, and a combiner configured to combine power transmitted to the power receiving antennas. At least one of a group of the plurality of power transmitting antennas and a group of the plurality of power receiving antennas is translated in a first direction relative to the other. During the translation, at least one of the power receiving antennas and at least one of the power transmitting antennas are coupled by one of an electric field and a magnetic field.

11 Claims, 6 Drawing Sheets

FIG. 5

WIRELESS POWER TRANSMISSION SYSTEM

BACKGROUND

Field

The present disclosure relates to technology for wirelessly supplying power.

Description of the Related Art

In recent years, research and development have been conducted on wireless power transmission systems that wirelessly supply power to mobile devices and moving objects. For example, Japanese Patent No. 6701231 describes a contactless power supply device having a switch for supplying AC power from an AC power supply to a power feeding element only when the contactless power supply device detects that a power receiving element provided in a moving object and the power feeding element face each other.

However, according to Japanese Patent No. 6701231, when the position of the power receiving element is detected to switch between the power feeding elements that supply power, precise control is required that takes into account variations in rise and fall times of the switch, detection accuracy of the sensor that detects the facing state, and the like, which complicates the device configuration.

SUMMARY

Various embodiments of the present disclosure provide a wireless power transmission system for wirelessly supplying power without switching between power feeding elements that supply power to power receiving elements.

According to one embodiment of the present disclosure, a wireless power transmission system includes a plurality of power transmitting antennas, a plurality of power receiving antennas, and a combiner configured to combine power transmitted to the power receiving antennas, wherein at least one of a group of the plurality of power transmitting antennas and a group of the plurality of power receiving antennas is translated in a first direction relative to the other, and wherein during the translation, at least one of the power receiving antennas and at least one of the power transmitting antennas are coupled by one of an electric field and a magnetic field.

Further features of the present disclosure will become apparent from the following description of example embodiments with reference to the attached drawings.

BRIEF DESCRIPTION OF THE DRAWINGS

FIG. 5 illustrates an arrangement of power transmitting antennas, power receiving antennas, and a shield.

DESCRIPTION OF THE EMBODIMENTS

Example embodiments are described below with reference to the accompanying drawings. The following description of example embodiments is in no way intended to limit the invention. All of the features and the combinations thereof described in the embodiments are not necessarily deemed to be essential to every embodiment of the present disclosure.

Note that the wireless power transmission system according to each of the example embodiments uses a technique called electromagnetic induction/magnetic resonance, which transmits power using a magnetic field or both an electric field and a magnetic field. However, in other embodiments, other techniques may be used. For example, an electric field coupling technique may be used, in which an electric field is mainly used to transmit power. Furthermore, each of the embodiments is described with reference to an example in which a copying machine is placed on a carriage in a copying machine inspection line in a factory, and power is supplied to the copying machine moving along the inspection line. However, the present invention is not limited thereto. For example, in other embodiments, the embodiments described below may be applied to a moving object that moves in a certain direction and that requires power supply, such as an automatic guided vehicle (AGV) used in a factory. In addition, the embodiments described below may be applied to a moving object that moves in a certain direction inside a product body (for example, when power is supplied to an ink cartridge inside a printer).

First Embodiment

Figure 1:
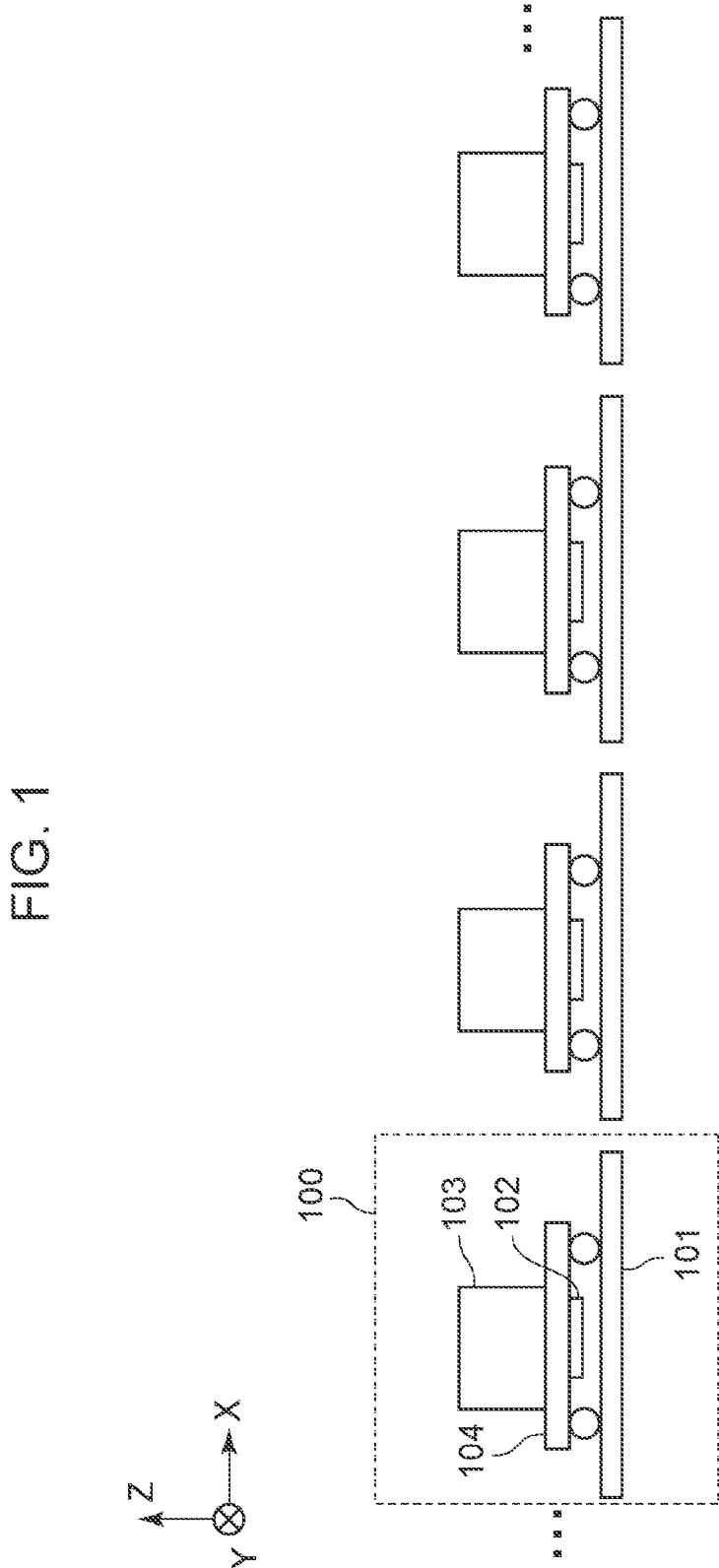
FIG. 1 is a schematic illustration of a wireless power transmission system.

FIG. 1 is a schematic illustration of a wireless power transmission system for a copying machine according to the present embodiment. In FIG. 1, the wireless power transmission system is viewed in the Y-axis direction, and the copying machine horizontally moves in the X-axis direction. A wireless power transmission system 100 includes a power transmitting unit 101, a power receiving unit 102, a copying machine 103, and a carriage 104 for horizontally moving the copying machine 103. The total length of an inspection line is several tens of meters, and more than a dozen copying machines are lined up in the inspection line, each subjected to one of inspection steps. To enable the copying machine to operate during the inspection, the power of the copying machine is turned ON, and the power is supplied wirelessly. Furthermore, to avoid power supply sources from being placed at one location from the viewpoint of power supply capacity, a plurality of power transmitting units 101 are disposed at a plurality of locations along the inspection line, and a plurality of power supply sources are provided.

Figure 2:
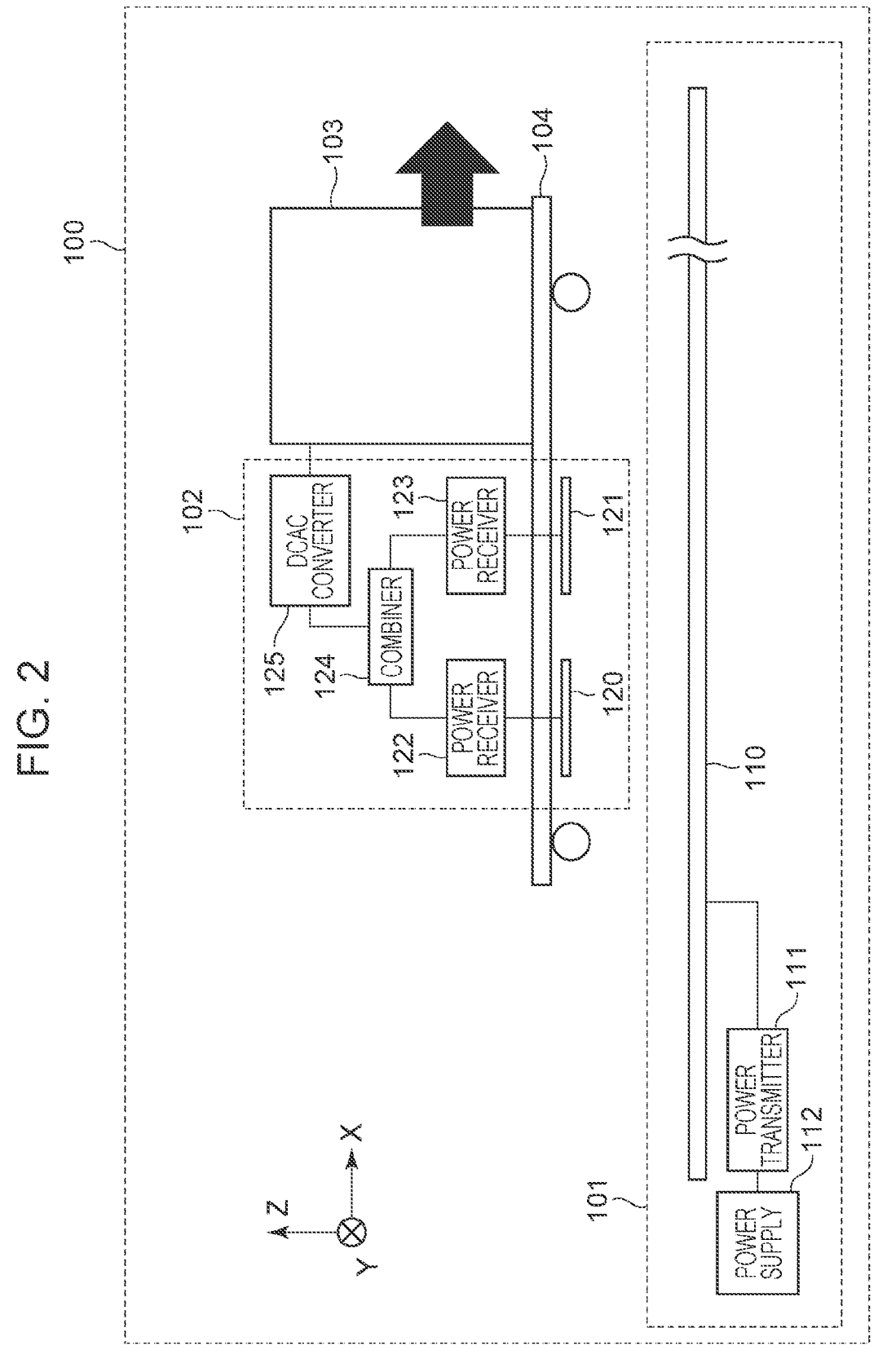
FIG. 2 is a system configuration diagram of the wireless power transmission system.

FIG. 2 is a detailed configuration diagram of the wireless power transmission system illustrated in FIG. 1. The wireless power transmission system 100 includes the power transmitting unit 101 that includes a power transmitting antenna 110, a power transmitter 111, and a power supply 112. Furthermore, the wireless power transmission system 100 includes the power receiving unit 102 that includes power receiving antennas 120 and 121, power receivers 122 and 123, a combiner 124 that combines power output from the power receivers 122 and 123, and a DCAC converter 125. Still furthermore, the wireless power transmission system 100 includes the copying machine 103 and the carriage 104 for moving the copying machine 103. The power transmitter 111 is composed of an existing power transmission circuit used when an electromagnetic induction or magnetic resonance technique is employed. More specifically, the power transmitter 111 converts a DC voltage supplied from the power supply 112 into a frequency suitable for power transmission using an inverter circuit and outputs the converted voltage to power transmitting antenna 110 extending in the X-axis direction. That is, the power transmitting unit 101 converts DC to AC in the power transmitter 111 and generates an AC magnetic field in the power transmitting antenna 110. In addition, at least one of the power receiving antennas 120 and 121 is disposed so as to couple to the power transmitting antenna 110, and the AC magnetic field generated by power transmitting antenna 110 interlinks with the power receiving antennas 120 and 121.

Each of the power receivers 122 and 123 is composed of a power receiving circuit widely used when an electromagnetic induction or magnetic field resonance technique is employed. More specifically, the power receivers 122 and 123 converts AC power received from at least one of the power receiving antennas 120 and 121 into DC power by using a rectifying circuit. The combiner 124 combines the DC power output from the power receivers 122 and 123. The DCAC converter 125 converts the DC power output from the combiner 124 into AC power and supplies the AC power to the copying machine 103.

The above-described configuration wirelessly supplies the power to the copying machine 103. Note that the power receiving unit 102 may move horizontally together with the carriage 104 that moves the copying machine or may move horizontally using a dedicated carriage and rails for the power receiving unit 102 so as to follow the carriage 104.

In general, copying machines do not include batteries mounted therein. For this reason, if there is a movement span in which power is not transmitted during movement, the supply of power to the copying machine may stop, causing data corruption or system failure. Furthermore, it takes time and effort to restart the system during inspection, resulting in a reduction in productivity. If one power transmitting antenna and two power receiving antennas are coupled, the power can be received without any problem. However, when the power receiving antenna moves across a plurality of separate power transmitting antennas, the power receiving unit 102 needs to receive the power without any instantaneous interruption.

Figure 3:
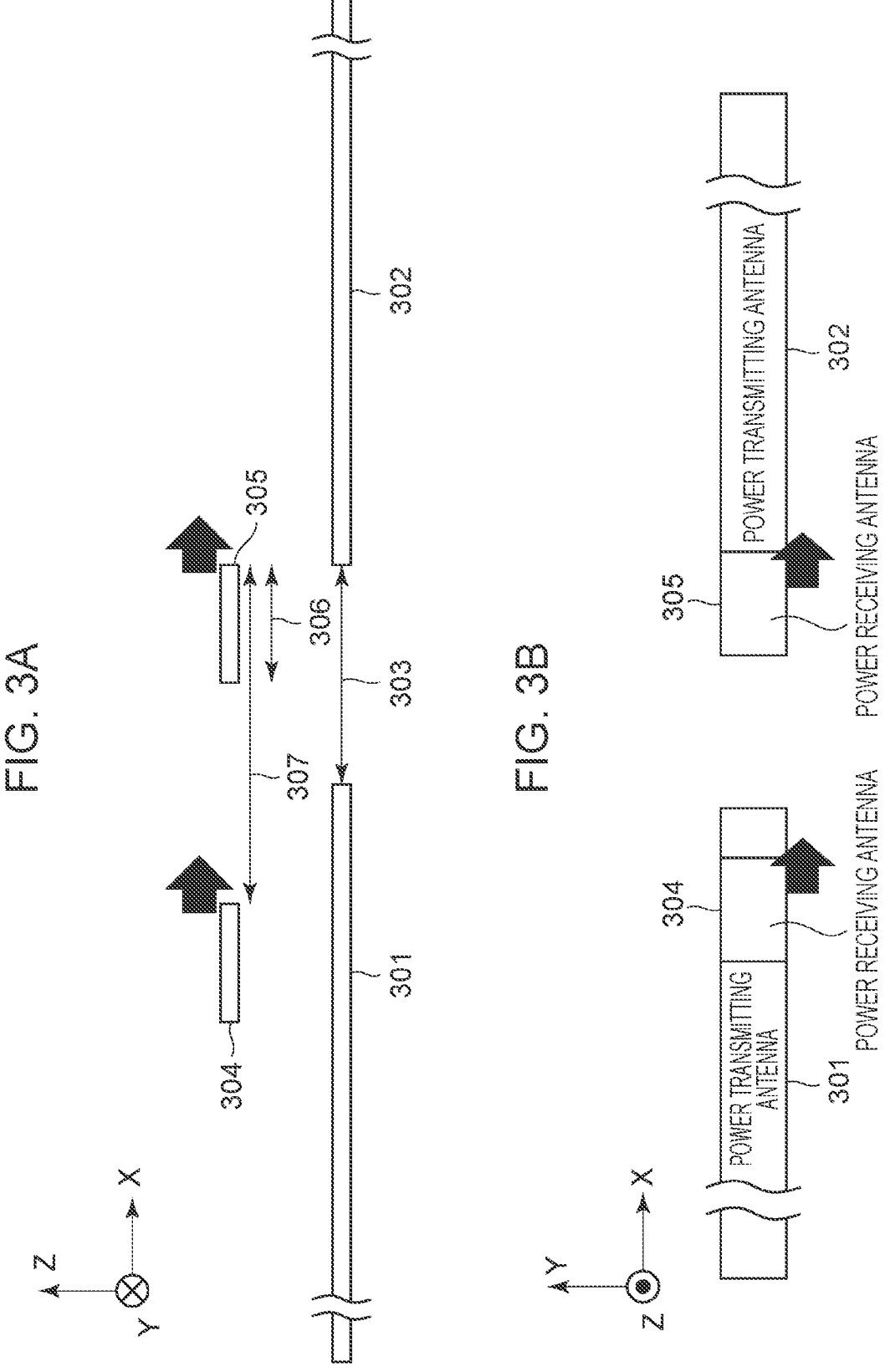
FIGS. 3A and 3B illustrate an arrangement of power transmitting antennas and power receiving antennas.

FIG. 3A illustrates the arrangement of power transmitting antennas and power receiving antennas, viewed from the Y-axis direction, which arrangement enables power transmission without any instantaneous interruption even between a plurality of power transmitting antennas. In FIG. 3A, two power transmitting antennas are illustrated among a plurality of power transmitting antennas arranged in a row on the X-axis. Note that the power transmitter, power supply, power receivers, combiner, DCAC converter, copying machine, and carriage illustrated in FIG. 2 are not illustrated in FIG. 3A. Power transmitting antennas 301 and 302 need to be arranged with an interval 303 therebetween so that the coupling between the antennas is substantially zero. This is because if the power transmitting antennas are coupled, the power is transmitted between the power transmitting antennas, resulting in a significant decrease in power transmission efficiency. For example, when the width of the power transmitting antenna in the Y-axis direction is 200 mm and the length of the power transmitting antenna in the X-axis direction is 1000 mm, the result of simulation using an electromagnetic field simulator indicates that if the interval 303 between the power transmitting antennas in the X-axis direction is greater than or equal to 100 mm, then the coupling coefficient is less than or equal to 0.005.

In addition, if the power receiving antenna 305 is coupled to each of the power transmitting antennas 301 and 302, the power transmitting antennas 301 and 302 are coupled via the power receiving antenna 305, resulting in a decrease in power transmission efficiency. For this reason, for example, when the interval 303 between the power transmitting antennas in the X-axis direction is 100 mm, the length 306 of the power receiving antenna needs to be set to less than or equal to 100 mm to prevent coupling of power receiving antenna 305 to both the power transmitting antennas 301 and 302. Furthermore, to achieve power transmission without any instantaneous interruption, when power receiving antenna 305 is positioned between power transmitting antennas, the other power receiving antenna 304 needs be coupled to the power transmitting antenna. That is, when a distance 307 is the sum of the interval between the power receiving antennas in the X-axis direction and the length 306 of the power receiving antenna, the distance 307 needs to be greater than or equal to the interval 303 between the power transmitting antennas in the X-axis direction.

As described above, the wireless power transmission system according to the present embodiment includes a plurality of power receiving antennas serving as power receiving elements, a plurality of power transmitting antennas serving as power feeding elements that wirelessly supply power to the power receiving elements, and a combiner that combines the power transmitted to the power receiving antennas. In the wireless power transmission system, an interval between the power transmitting antennas is set to greater than a predetermined distance to prevent coupling between the power transmitting antennas by an electric field or a magnetic field. In addition, the length of the power receiving antenna is set to be less than the interval between the power transmitting antennas. Furthermore, the sum of the interval between the power receiving antennas and the length of the power receiving antenna is set to greater than the interval between the power transmitting antennas so that at least one power receiving antenna is coupled to any one of the power transmitting antennas by an electric field or a magnetic field. By arranging the power transmitting antennas and the power receiving antennas in this manner, deterioration of the power transmission efficiency can be reduced, and the power can be supplied to a moving object without any instantaneous interruption. As used herein, the term "coupled" refers to the fact that the coupling coefficient is greater than or equal to 0.1.

Second Embodiment

Figure 4:
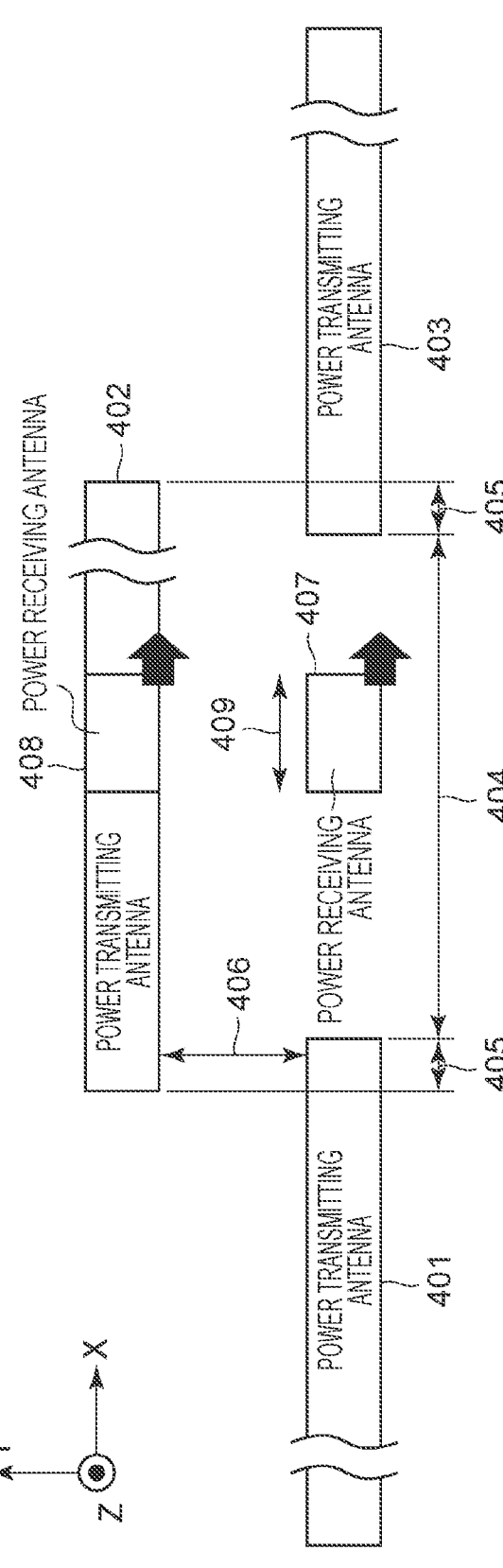
FIG. 4 illustrates an arrangement of power transmitting antennas and power receiving antennas.

According to the first embodiment, the system configuration has been described in which the power receiving antennas are arranged in the same direction as the movement direction. FIG. 3B illustrates the arrangement of the power transmitting antennas and the power receiving antennas according to the first embodiment as viewed in the Z-axis direction. According to the present embodiment, a system configuration is described in which power receiving antennas are arranged in a direction substantially perpendicular to the movement direction. FIG. 4 illustrates the arrangement of the power transmitting antennas and the power receiving antennas according to the present embodiment as viewed in the Z-axis direction. The power transmitting antennas are arranged in two rows in the Y-axis direction, and the plurality of power transmitting antennas in each row are arranged on the X-axis. In FIG. 4, three of the plurality of power transmitting antennas are illustrated. Power receiving antennas 407 and 408 move horizontally in the X-axis direction. Note that the power transmitter, power supply, power receivers, combiner, DCAC converter, copying machine, and carriage illustrated in FIG. 2 are not illustrated in FIG. 4.

Like the first embodiment, power transmitting antennas 401, 402, and 403 need to be arranged so that the coupling between the antennas is substantially zero. For example, when the width of the power transmitting antenna in the Y-axis direction is 200 mm and the length of the power transmitting antenna in the X-axis direction is 1000 mm, the result of simulation using an electromagnetic field simulator indicates that if an interval 404 between the power transmitting antennas in the X-axis direction is greater than or equal to 100 mm, then the coupling coefficient is less than or equal to 0.005. In addition, a length 405 is the overlapping length of the power transmitting antenna 401 and the power transmitting antenna 402 (also, the overlapping length of the power transmitting antenna 402 and the power transmitting antenna 403) as viewed in the Y-axis direction, and an interval 406 is the interval between the power transmitting antenna 402 and each of the power transmitting antennas 401 and 403 in the Y-axis direction. When the length 405 is 50 mm, the interval 406 needs to be greater than or equal to 70 mm.

Like the first embodiment, if the power transmitting antennas 401 and 403 are coupled via the power receiving antenna 407, the power transmission efficiency is reduced. For this reason, a length 409 of the power receiving antenna needs to be less than the interval 404 between the power transmitting antennas in the X-axis direction. Furthermore, to achieve power transmission without any instantaneous interruption, when power receiving antenna 407 is positioned between power transmitting antennas, the other power receiving antenna 408 need to be coupled to the power transmitting antenna. That is, the overlapping length 405 of the power transmitting antenna 401 and the power transmitting antenna 402 (the overlapping length 405 of the power transmitting antenna 402 and the power transmitting antenna 403) as viewed in the Y-axis direction needs to be greater than 0 mm.

As described above, the wireless power transmission system according to the present embodiment includes a plurality of power receiving antennas serving as power receiving elements, a plurality of power transmitting antennas serving as power feeding elements that wirelessly supply power to the power receiving elements, and a combiner that combines the power transmitted to the power receiving antennas. In the wireless power transmission system, the interval between power transmitting antennas is set so that the power transmitting antennas are not coupled by an electric field or a magnetic field. In addition, the length of the power receiving antenna is set to less than the interval between the power transmitting antennas. Furthermore, an overlapping area of the power transmitting antennas is provided so that at least one power receiving antenna is coupled to any one of the power transmitting antennas by an electric field or a magnetic field. By arranging the power transmitting antennas and the power receiving antennas in this manner, the deterioration of the power transmission efficiency can be reduced, and the power can be supplied to a moving object without any instantaneous interruption. As used herein, the term "coupled" refers to the fact that the coupling coefficient is greater than or equal to 0.1.

Third Embodiment

Figure 5:
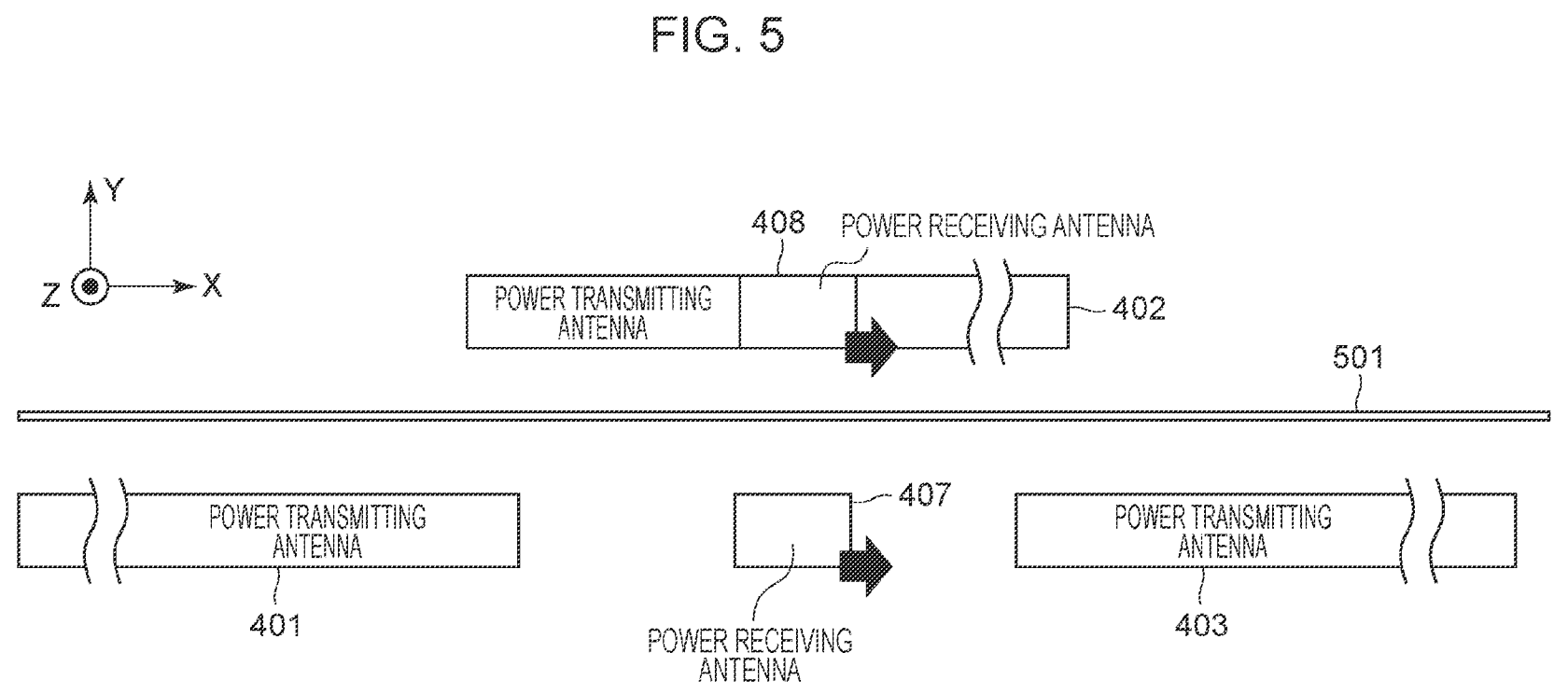

According to the second embodiment, the system configuration has been described in which the power receiving antennas are arranged in a direction substantially perpendicular to the movement direction. According to the present embodiment, a system configuration is described in which a shield for reducing power transmitted between power transmitting antennas is added to the system configuration according to the second embodiment. FIG. 5 illustrates the arrangement of the power transmitting antennas and the power receiving antennas according to the present embodiment as viewed from the Z-axis direction. As in FIG. 4, the power transmitting antennas are arranged in two rows in the Y-axis direction, and the plurality of power transmitting antennas are arranged on the X-axis. In FIG. 5, three of the plurality of power transmitting antennas are illustrated. A shield 501 is disposed between the row containing the power transmitting antennas 401 and 403 and the row containing the power transmitting antenna 402. The power receiving antennas 407 and 408 move horizontally in the X-axis direction. Note that the power transmitter, power supply, power receivers, combiner, DCAC converter, copying machine, and carriage illustrated in FIG. 2 are not illustrated in FIG. 5.

When power of several kilowatts (KW) is transmitted from a power transmitting antenna to a power receiving antenna, power of several tens of watts (W) may be transmitted between the power transmitting antennas even if the coupling between the power transmitting antennas is weak. That is, even if the coupling coefficient is small, the power received by the power transmitting antenna increases if the transmitted power is high, which may cause heat generation. Therefore, according to the present embodiment, the shield 501 for preventing coupling is disposed between the power transmitting antennas. In this manner, the coupling between the power transmitting antennas can be reduced more and, thus, the power transmitted from a power transmitting antenna to a power transmitting antenna can be reduced. Note that the shield may be a metal, such as aluminum or stainless steel, a magnetic material, such as ferrite, or an electromagnetic wave absorber in which a magnetic material and a dielectric material are mixed.

Other Embodiments

To reduce the power transmitted between power transmitting antennas, a configuration is described below that is different from the configurations according to the above-described embodiments. For example, in the antenna arrangement illustrated in FIG. 4, the power transmitted between the power transmitting antennas can be reduced by supplying power of different frequencies to the antennas arranged in the row containing the power transmitting antennas 401 and 403 and the antennas arranged in the row containing the power transmitting antenna 402. In general, in a wireless power transmission system, the constants of coils and capacitors are set so that a power transmitting antenna and a power receiving antenna resonate at a certain frequency, and the power transmitter is also set up to perform switching at that frequency. By changing the switching frequency of the power transmitter in the wireless power transmission system for each row in which the power transmitting antennas are arranged, the power can be efficiently transmitted to the power receiving antenna to which the power is to be transmitted. In addition, the power transmitted to a power transmitting antenna that resonates at another frequency can be reduced.

While the above-described embodiments have been described with reference to the configuration including two power receiving antennas, the configuration may include three or more power receiving antennas. In this case, the power receiving antenna is disposed so as not to span two power transmitting antennas during movement.

Figure 6A:
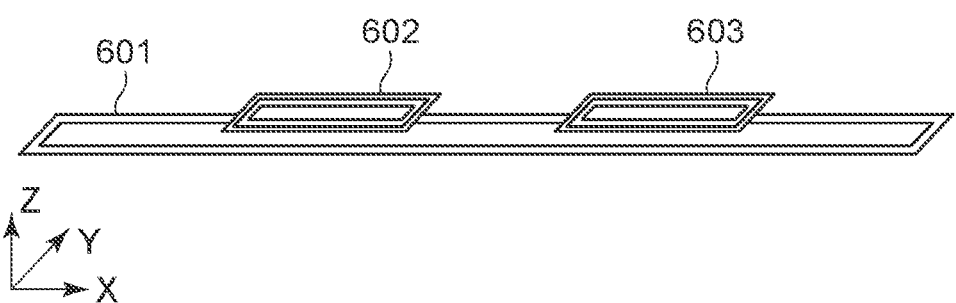
FIGS. 6A to 6C illustrate the shapes of the power transmitting antenna and the power receiving antenna.
Figure 6B:
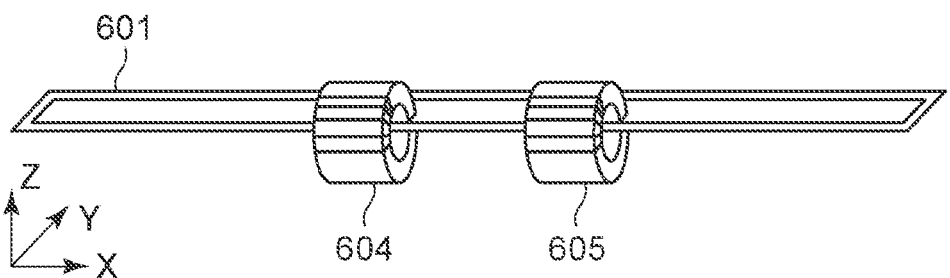
Figure 6C:
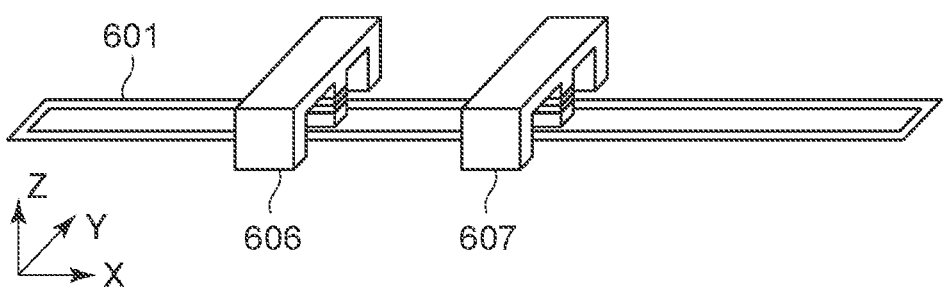

A spiral antenna illustrated in FIG. 6A may be used as the power transmitting antenna and the power receiving antenna according to the above-described embodiments. An antenna 601 is a power transmitting antenna, and antennas 602 and 603 are power receiving antennas. Alternatively, the power receiving antennas according to the above-described embodiments may have a shape in which a conductive wire is wound around a C-shaped magnetic core, like the power receiving antennas 604 and 605 illustrated in FIG. 6B. Still alternatively, like power receiving antennas 606 and 607 illustrated in FIG. 6C, the power receiving antennas according to the above-described embodiments may have a shape in which a conductive wire is wound around an E-shaped magnetic core. Note that the number of turns of each of the power transmitting antenna and the power receiving antenna can be set to any number.

While the above-described embodiments have been described with reference to the power receiving antenna disposed on the bottom surface of the carriage and the power transmitting antenna disposed on the surface facing the power receiving antenna, the configuration is not limited thereto as long as the power transmitting antenna and the power receiving antenna can be coupled. For example, a power transmitting antenna may be disposed on the ceiling of an indoor facility, and a power receiving antenna may be disposed so as to face the power transmitting antenna on the ceiling. Alternatively, the power receiving antenna may have a shape in which a conductive wire is wound around a C-shaped magnetic core, and the power transmitting antenna may be disposed so as to pass through a hollow portion of the magnetic core.

According to the above-described embodiments, the power is supplied to a moving object having the power receiving antenna that is translated. However, if the power receiving antenna and the power transmitting antenna are translated relative to each other, the power may be supplied to a stationary object. In this case, the power transmitting antenna is moved such that the power receiving antenna and the power transmitting antenna are translated relative to each other.

While the second and third embodiments have been described with reference to two rows of the power transmitting antennas offset in the Y-axis direction, the power transmitting antennas may be arranged in three or more rows.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-175034 filed Oct. 26, 2021, which is hereby incorporated by reference herein in its entirety.

What is claimed is:
1. A wireless power transmission system comprising:
a plurality of power transmitting antennas including a first power transmitting antenna extending in a first direction and a second power transmitting antenna extending in a second direction, the plurality of power transmitting antennas being arranged in the first direction;
a plurality of power receiving antennas including a first power receiving antenna and a second power receiving antenna, the plurality of power receiving antennas being arranged in the first direction; and
a combiner configured to combine power received by the first power receiving antenna and power received by the second power receiving antenna, wherein
at least one of the plurality of power receiving antennas and at least one of the plurality of power transmitting antennas are coupled by one of an electric field and a magnetic field,
a length of each of the first power receiving antenna and the second power receiving antenna in the first direction is less than an interval between the first power transmitting antenna and the second power transmitting antenna that are arranged in the first direction, and the length of the first power receiving antenna in the first direction is less than a length of the first power transmitting antenna in the first direction,
the length of the second power receiving antenna in the first direction is less than a length of the second power transmitting antenna in the first direction,
a sum of the length of the first power receiving antenna in the first direction and an interval between the first power receiving antenna and the second power receiving antenna is greater than the interval between the first power transmitting antenna and the second power transmitting antenna that are arranged in the first direction, and
the interval between the first power transmitting antenna and the second power transmitting antenna in the first direction is one tenth or more of the lengths of the first power transmitting antenna and the second power transmitting antenna in the first direction.

2. The wireless power transmission system according to claim 1, wherein a shield is disposed between the power transmitting antennas included in the plurality of power transmitting antennas so that coupling of the power transmitting antennas by an electric field or a magnetic field decreases.

3. The wireless power transmission system according to claim 2, wherein the shield is any one of a metal, a magnetic material, and an electromagnetic wave absorber in which a magnetic material and a dielectric material are mixed.

4. The wireless power transmission system according to claim 1, wherein the power receiving antennas are arranged in a second direction that is substantially perpendicular to the first direction.

5. The wireless power transmission system according to claim 4, wherein the power transmitting antennas are arranged in a plurality of rows in the first direction at each of positions in the second direction.

6. The wireless power transmission system according to claim 4, wherein AC power of a predetermined frequency is supplied to a first row in which the power transmitting antennas are arranged in the first direction, and AC power of a different frequency is supplied to a second row in which the power transmitting antennas are arranged in the first direction.

7. The wireless power transmission system according to claim 4, wherein a shield is disposed between a first row in which the power transmitting antennas are arranged in the first direction and a second row in which the power transmitting antennas are arranged in the first direction.

8. The wireless power transmission system according to claim 1, wherein the power transmitting antennas and the power receiving antennas are spiral antennas.

9. The wireless power transmission system according to claim 1, wherein each of the power receiving antennas includes a magnetic core and a conductive wire.

10. The wireless power transmission system according to claim 1, further comprising:

a carriage for inspecting an apparatus and configured to convey the apparatus.

11. The wireless power transmission system according to claim 1, wherein the combiner is further configured to output power to a printer.

* * * * *